No. 832,860. PATENTED OCT. 9, 1906.
H. K. HITCHCOCK.
APPARATUS FOR THE MANUFACTURE OF SHEET GLASS.
APPLICATION FILED AUG. 23, 1905.

WITNESSES:
Herbert Bradley.
Dwight Benton.

INVENTOR
Halbert K. Hitchcock
by Christy and Christy
Atty's

No. 832,860.　　　　　　　　　　　　　PATENTED OCT. 9, 1906.
H. K. HITCHCOCK.
APPARATUS FOR THE MANUFACTURE OF SHEET GLASS.
APPLICATION FILED AUG. 23, 1905.

WITNESSES:
Herbert Bradley.
Dwight Benton.

INVENTOR
Halbert K. Hitchcock
by Christy and Christy,
Atty's.

No. 832,860. PATENTED OCT. 9, 1906.
H. K. HITCHCOCK.
APPARATUS FOR THE MANUFACTURE OF SHEET GLASS.
APPLICATION FILED AUG. 23, 1905.

WITNESSES:
Herbert Bradley
Dwight Benton

INVENTOR
Herbert K. Hitchcock
by Christy and Christy
Att'ys

No. 832,860. PATENTED OCT. 9, 1906.
H. K. HITCHCOCK.
APPARATUS FOR THE MANUFACTURE OF SHEET GLASS.
APPLICATION FILED AUG. 23, 1905.

WITNESSES:
Herbert Bradley.
Dwight Benton.

INVENTOR
Halbert K. Hitchcock
by Christy and Christy
Atty's.

UNITED STATES PATENT OFFICE.

HALBERT K. HITCHCOCK, OF TARENTUM, PENNSYLVANIA, ASSIGNOR TO HIMSELF, AND CHARLES W. BROWN, TRUSTEE, OF PITTSBURG, PENNSYLVANIA.

APPARATUS FOR THE MANUFACTURE OF SHEET-GLASS.

No. 832,860. Specification of Letters Patent. Patented Oct. 9, 1906.

Application filed August 23, 1905. Serial No. 275,463.

*To all whom it may concern:*

Be it known that I, HALBERT K. HITCHCOCK, a citizen of the United States, residing at Tarentum, in the county of Allegheny and State of Pennsylvania, have invented or discovered certain new and useful Improvements in Apparatus for the Manufacture of Sheet-Glass, of which improvement the following is a specification.

The invention described herein relates to certain improvements in apparatus for forming sheets of glass in the manner described in application Serial No. 275,462, filed August 23, 1905, and has for its object a construction of apparatus whereby the glass may be drawn continuously through a slot from a suitable receptacle into a properly-heated chamber, cut off into desired lengths, and automatically transferred to an annealing-kiln or runway.

The invention is hereinafter more fully described and claimed.

In the accompanying drawings, forming a part of this specification.

Figure 6:
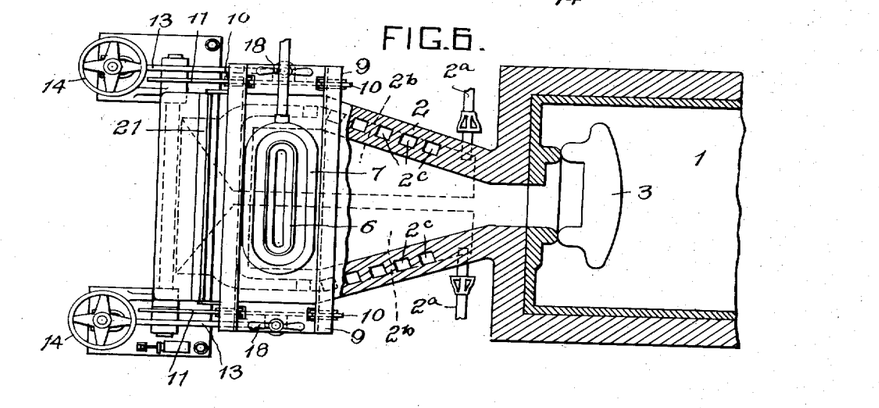
Fig. 6 is a view, partly in section and partly in plan, showing the glass-receptacle and slot mechanism.

In the practice of my invention it is preferred to arrange the slot and its connections, to be hereinafter described, outside of the furnace or receptacle 1, in which the glass is melted or a sufficient supply retained. As shown in Fig. 6, a spout 2 extends from the receptacle or chamber 1, preferably increasing in width gradually to the point where the slot is located. Provision is made for regulating the temperature of the channel or spout and the glass flowing along same by means of burners 2$^a$, discharging into combustion-chambers 2$^b$ under the spout or channel. These combustion-chambers are connected to a chamber 19, from which the products of combustion, &c., flow back through the channel or spout into and through the receptacle 1. A series of vertical passages 2$^c$ along each side of the spout or channel also connect with the chambers 2$^b$, and by closing more or less of these vertical passages the temperature of the glass can be regulated as required.

While any suitable means may be employed for preventing the flow of glass through the spout or channel, it is preferred to employ a float 3, which can be shifted so as to cover the entrance to the spout or channel, as shown in Fig. 6, when it is desired to prevent a flow of glass to the slot.

Figure 1:
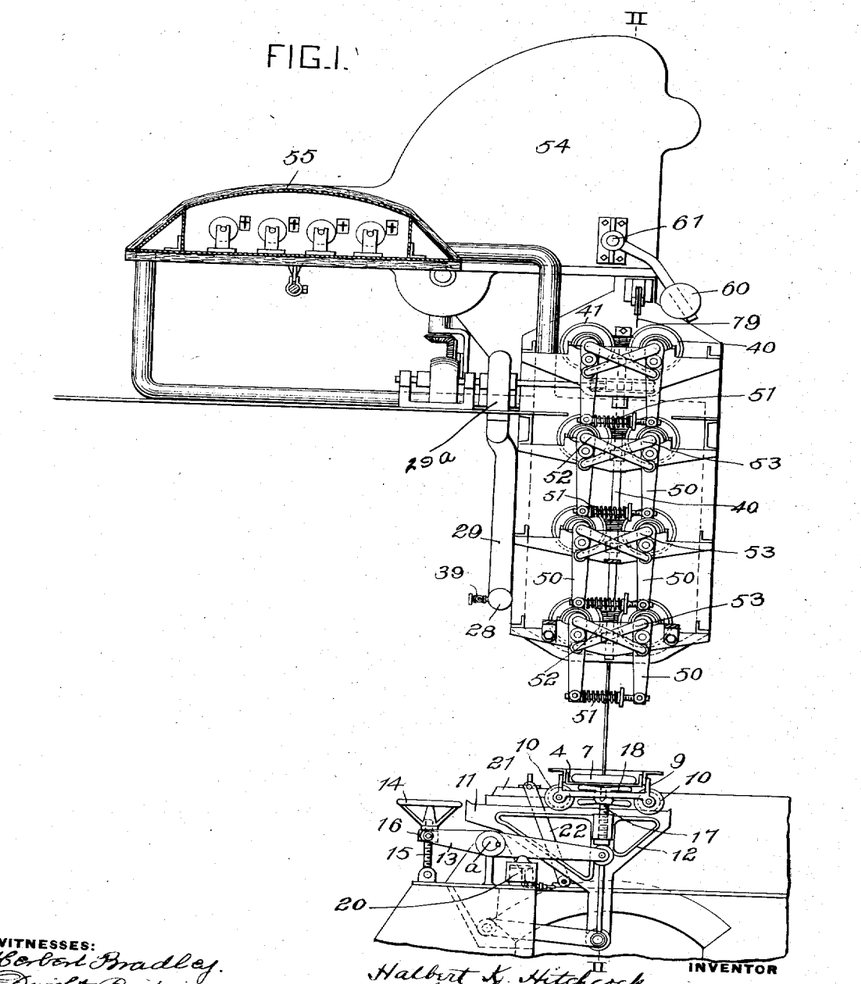
Figure 1 is a side elevation of my improved apparatus.
Figures 3, 10, 11:
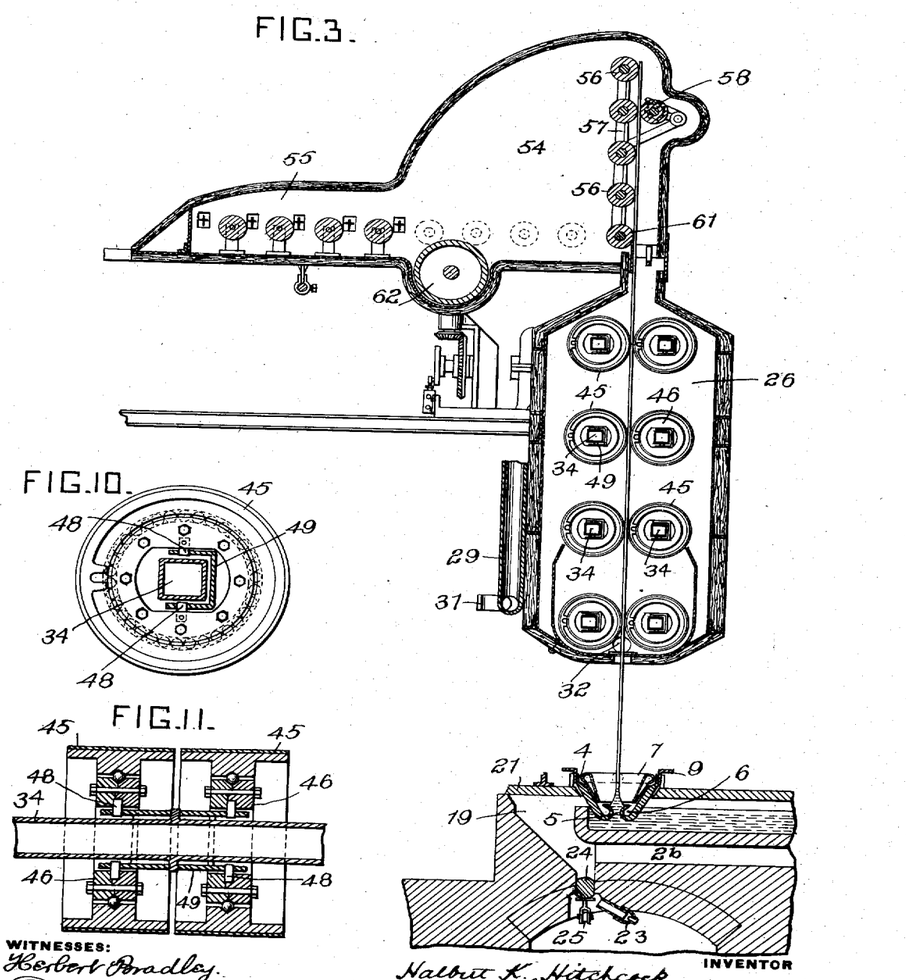
Fig. 3 is a sectional elevation on the line III III, Fig. 2.
Figs. 10 and 11 are sectional detailed views showing the construction of rolls employed in applying tension to the sheets.
Figure 4:
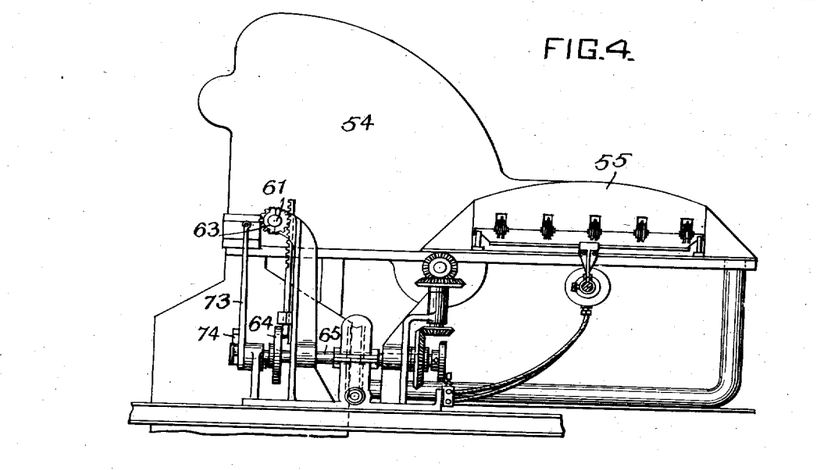
Fig. 4 is an elevation of the upper part of the mechanism of the side opposite that shown in Fig. 1.

As shown in Figs. 1, 3, and 6, the slot mechanism 4 is formed of metal protected, as regards the portion projecting down into the spout or channel, by fire-clay or other suitable material. The orifice 5, through which the glass is fed, is formed along the lower side of the slot mechanism, and channels 6 are preferably formed outside of the wall of the slot 5, so as to form cooling-surfaces whereby the temperature of the walls of the slot may be regulated. A blast-nozzle 7 is arranged in such relation to the shell 4 as to direct a temperature-regulating medium, such as hot or cold air, down into the channels 6, surrounding the slot, such nozzle being connected to any suitable source of supply. This shell 4 extends down into the spout or channel 2 a sufficient distance to insure the formation of a sufficient head of glass to cause the latter to flow up into and, if desired, through the slot. The shell 4 is supported in a frame 9, provided with rollers 10, adapted to move along tracks 11 on the frames 12. These frames are supported by lever 13, pivotally connected to the frames, said levers being pivoted, as indicated at $a$. The outer ends of the levers are provided with blocks 16, pivotally connected to the levers and adapted to slide up and down threaded rods 15, pivotally mounted on a suitable support. A nut provided with a hand-wheel 14 will serve as a stop to regulate the depth of immersion of the lower end of the shell 4 into the spout or channel. The frame 9 can be secured in operative position and leveled, as shown in Figs. 1, 3, and 6, on the frame 12 by any suitable means—such, for example, as by threaded bolts 17, passing through lugs on the frames and through the side pieces on the truck-frame 9, the latter being clamped to the bolt by means of nuts 18, as shown in Fig. 1. When it is desired to shift the shell or slot mechanism 4 out of operative position and into position over a chamber 19, the truck-frame is released by unscrewing the nuts 18, and fluid-pressure is admitted into the cylinder of the fluid-pressure mechanism 20, the movable member of which bears against the levers 13. By the operation of these fluid-pressure mechanisms the frames 12 and the truck carried thereby are raised to such a height that the lower end of the shell 4 will pass over the edge of the spout or channel 2, as shown in Fig. 3. The truck is then moved along the track of the frame 12, carrying with it the shell or slot mechanism 4, and the cover formerly covering the chamber 19 is shifted to the right in Fig. 3 to the position occupied by the shell or slot mechanism 4, which is then lowered by permitting the escape of air from the fluid-pressure mechanisms 20 until the shell 4 will project down into the chamber 19. To facilitate the shifting of the cover 21, it is preferred to mount it on links 22, which will permit the cover to be swung from the position shown in Fig. 3 to that occupied by the shell 4 in said figure. Provision is made for the melting out of any glass adhering to the shell slot mechanism while in position in the chamber 19 by means of a gas-burner 23, discharging into the combustion-chamber, said passage being normally closed by a stopper 24, supported by a lever 25, which can be manipulated from the outside of the structure.

Figure 2:
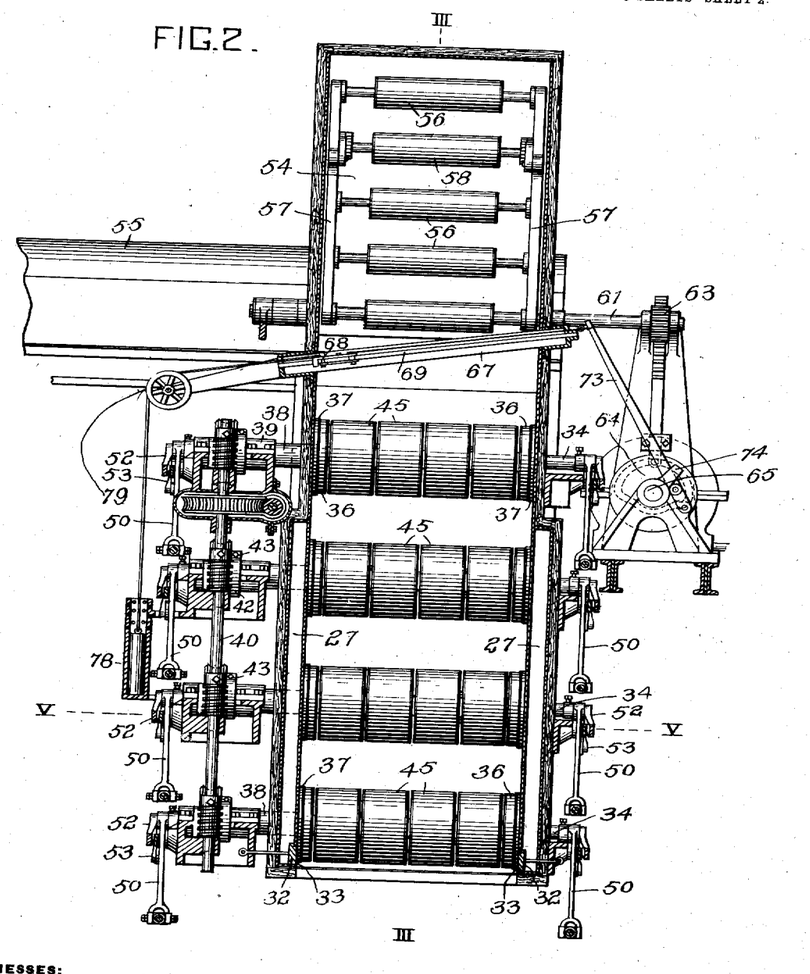
Fig. 2 is a sectional elevation of the drawing mechanism on a line indicated by the line II II, Fig. 1.
Figure 5:
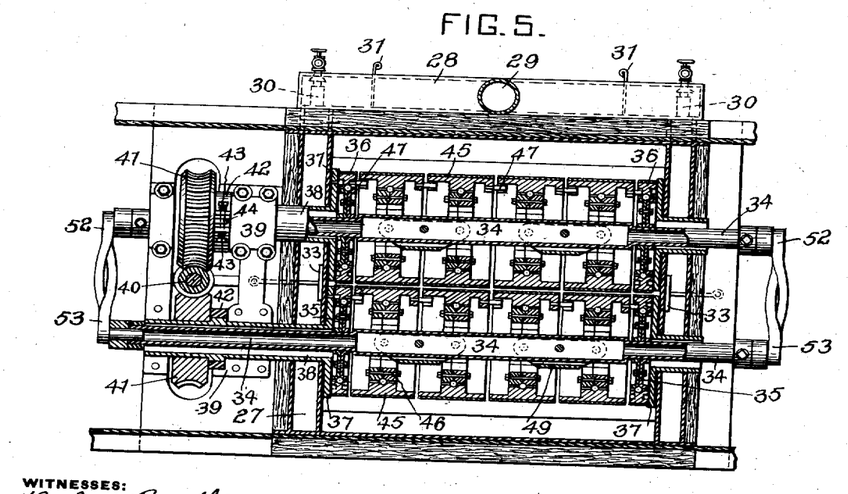
Fig. 5 is a sectional view on an enlarged scale, the plane of section being indicated by the line V V, Fig. 2.

The glass as it is forced through the slot is drawn upward into a chamber 26 by means of a series of rollers arranged in said chamber. As shown in Figs. 1, 2, and 3, the side walls of this chamber for a portion of their length are provided with passages 27, which connect with a transverse chamber 28, having air-supply pipe 29, leading to a blower 29ª. Gas-burners 30 are arranged in the chamber 28, so as to deliver products of combustion into the side chambers 27, air for combustion entering through the pipe 29. It is preferred to regulate the flow of air to the chambers 27 by means of valves 31, as shown in Fig. 5. These side chambers 27 are provided with ports 32 for admitting heated air into the main chamber 26, said ports being controlled by valves 33. A suitable number of pairs of rollers suitably driven and held yieldingly against opposite sides of the sheet are arranged within the chamber. Four pairs are shown, but a larger number of pairs may be employed. In order to provide for inequalities or irregularities in the surface of the glass, the rollers are preferably made flexible as regards their outer perimeters. A desirable construction to this end is shown in Figs. 5, 10, and 11. Supporting-shafts 34 pass through the walls of the chamber 26, the outer ends of said shafts being made round, while the inner portions are preferably rectangular, as shown in Figs. 10 and 11. Disks 35 are loosely mounted on the round portions of the shafts at the ends of the square portion, as shown in Fig. 5, and around these disks are arranged rings 36, friction-rollers being interposed between the rings and disks, so that the former may move freely and easily on the disks. The rings 36 are driven from disks 37 on the tubular shafts 38, surrounding the round portions at one end of the supporting-shafts 34. These tubular shafts 38 are mounted in suitable bearings 39 and are driven by the worm-shaft 40 through the medium of worm-wheels 41, which are yieldingly connected to the tubular shafts. A suitable construction to this end consists of bands 42, surrounding collars on the tubular shafts and adapted to be drawn into frictional engagement with such collars by means of bolts 43, passing through lugs on the bands and lugs 44 on the worm-wheels 41, said lugs projecting between the lugs on the bands. As shown in Fig. 5, springs are interposed between the nuts on the bolts 43 and the lugs on the bands, so that in case of undue resistance on the parts of the rollers driven by the shaft 38 the bands may slip on their collars and prevent any injury to the mechanism or material operated on. The intermediate rings 45, forming the rollers, are mounted on collars 46, preferably formed in sections, as shown in Fig. 5, friction-rollers being interposed between the rings and the collars. The rings 45 are driven from the end collar 36 by means of pins 47, connecting the series of rings with each other and the end ring with the driving-collar 36. The pins 47 are secured to one of the rings and project between lugs on the adjacent sections, thus permitting one section to move transversely of its axis of rotation without breaking the driving connection with adjacent sections. The collars 46 of adjacent roll-sections are supported on pivot-pins or trunnions 48 on the swinging frames 49, which are pivotally mounted on the square portions of the supporting-shaft 34. By this construction one section of the rollers will move in when a portion of the glass thinner than the other portions passes between said sections. When a swell or enlargement passes between opposing sections or rings, said sections will move outwardly, and as the other sections or rings connected to the same frames cannot move inwardly as they bear on the glass the shafts 34 will be forced apart at one end. Thus the several sections of the roller and the roller can automatically adjust themselves to inequalities of surface. While these rollers may be caused to yieldingly bear against opposite sides of the sheet by any suitable means, it is preferred to employ the construction shown in Fig. 1 for that purpose, so as to insure equal movement of both members of a pair.

As shown in Figs. 1 to 5, pivotally-mounted arms 50 have one end connected to the shafts 34, while the opposite ends are adapted to be shifted relatively to each other by springs 51. These arms are connected by cross-bars 52 and 53, forming a toggle connection, so that any movement imparted to one member of a pair of rollers will be also imparted to the other pair, and such movements will be equal. By the action of these rollers a tension is applied to the glass as it is fed through the slot of the shell 4 relative to the rate of feed through said slot to reduce the sheet to the desired thickness. The sheet is fed by these rollers through the heated chamber into a chamber 54, which forms a connection between the heated chamber 26 and the runway 55, which is provided with any suitable form or construction of mechanism, preferably that shown and described in Letters Patent No. 805,070, dated November 21, 1905. The glass is fed by the rollers in the heated chamber up along and in contact with rollers 56, mounted on a swinging frame 57 in the chamber 54, and the glass is held in contact with said rollers by means of a pivotally-mounted roller 58, carried by a bracket secured to the frame 57. Either the roller 58 or the one on the frame in line therewith is provided with a pawl-and-ratchet device permitting the roller to rotate in the direction of the movement of the glass, but preventing any reverse rotation, thereby preventing any dropping down of the glass after it has been severed from the main body. It is preferred that this frame 57, with its rollers, should be counterbalanced by a weight 60, as shown in Fig. 1. After the glass has been severed, as will be hereinafter described, the shaft 61, which forms a pivotal support for the frame 57, is rotated, thereby turning the frame down to the position shown by dotted lines in Fig. 3, thus bringing one or more of the rollers 56 into frictional engagement with the positively-driven drum 62. By the rotation of the rollers 56 the section of glass carried down by the frame 57 will be shifted into line with the mechanism employed for moving the glass through the runway 55. The rotation of the shaft 61 can be effected by any suitable means—such, for example, as a rack and pinion 63, (shown in Fig. 2,) the rack being reciprocated by means of a grooved cam 64 on the shaft 65.

Figure 7:
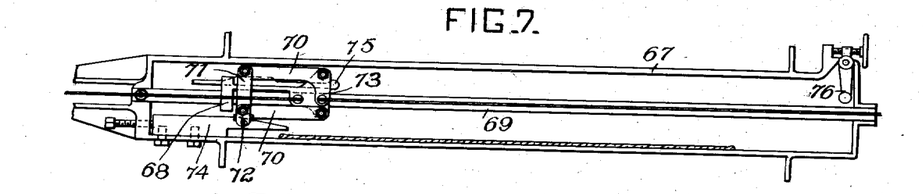
Figs. 7, 8, and 9 are detailed views illustrating the cutting apparatus.
Figure 8:
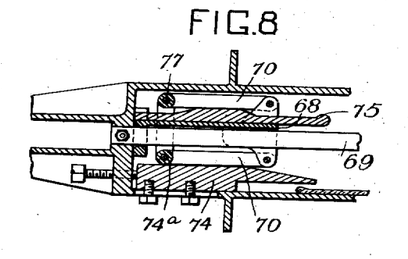
Figure 9:
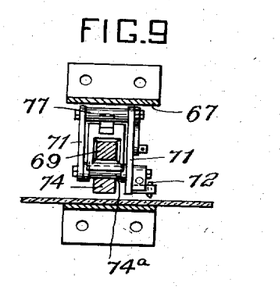

In order to sever the glass, it is preferred to employ the construction shown, although other constructions may be used, if desired. This preferred construction consists of a frame 67, arranged at an angle to the direction of movement of the glass, as shown in Figs. 2, 7, 8, and 9. One member or plate of this frame serves as a support for the glass when operated on by the cutter, which is caused to traverse the sheet without interrupting the movement of the latter. A carriage or slide 68 is movably mounted on a rod 69, secured in the frame 67, and to this slide are pivotally attached arms 70, connected by links 71. To one of these links or an extension thereof is secured the cutting-tool 72. The slide 68 is adapted to be shifted by suitable mechanism after a predetermined length of glass has passed beyond the position occupied by the frame 67. The movement of the slide in the direction to cut the glass is effected by means of a lever 73, connected by a cord to the slide. This lever is shifted by an arm 74, carried by the shaft 65. As the slide 68 moves to the right or in the direction for cutting, the cutter 72 is supported out of contact with the glass until it passes within the edge of glass sheet by guide 74, on which a roller 74$^a$, carried by the arms 70, will move, said guide extending, as shown in Figs. 7 and 8, beyond the edge of the sheet. As shown in Fig. 7, the upper arm 70 is provided with an angular extension, to which the cord connected to the lever 73 is attached, so that the pull required to shift the cutting device will also tend to press the cutting-tool against the surface of the glass during its movement across the same. As the slide 68 reaches the limit of its movement to the right a cam-plate 75 will strike against an adjustable stop 76, thereby shifting said plate to the left and causing a projection thereon to pass under a roller 77, carried by the arm 70, and lift the cutter out of contact with the glass. The return movement of the slide 68, with the cutter, is effected by means of a weight 78, connected to the carriage by a cord passing over a pulley 79. As the slide approaches the limit of its movement to the left the plate 75 will strike against a wall or abutment and be shifted to the right, so that the arm 70 will be free to drop or move inward; but prior to this shifting of the plate 75 the other roller carried by the arm 70 will have passed up on the guide-surface 74, and thus prevent an inward movement of the cutter until the slide has again moved a short distance to the right, shifting the cutter within the edge of the glass. The frame 67 is arranged at such an angle to the direction of movement of the glass that while the cutter is moving across the sheet it will also move in the same direction as the sheet and at the same rate. Hence the line of cut will be straight across the sheet.

I claim herein as my invention—

1. In an apparatus for the manufacture of sheet-glass, the combination of a glass-containing receptacle, a discharge slot or opening having peripherally-continuous outwardly-flaring walls, and means for adjusting the slot relative to the height of glass in the receptacle.

2. In an apparatus for the manufacture of sheet-glass, the combination of a glass-containing receptacle, a slot or orifice having peripherally-continuous outwardly-flaring walls, means for adjusting the slot relative to the height of glass in the receptacle, and means for securing it in its adjusted position.

3. In an apparatus for the manufacture of sheet-glass, the combination of a glass-containing receptacle, a shell having a slot or orifice, a vertically-movable frame carrying the shell, and means for shifting the shell along the frame.

4. In an apparatus for manufacturing glass sheets, the combination of a glass-containing chamber, a channel or spout extending therefrom, and a float controlling the flow of glass into the spout or channel.

5. In an apparatus for manufacturing glass sheets, the combination of a glass-containing chamber, a spout or channel extending therefrom, means for regulating the temperature of glass in the spout or channel, a shell having a slot or orifice, and means for shifting the shell.

6. In an apparatus for manufacturing glass sheets, the combination of a movable shell having a slot or orifice connected to a glass-containing receptacle, and means for melting glass adhering to the walls of the slot or orifice.

7. In an apparatus for manufacturing glass sheets, the combination of a glass-containing receptacle, a chamber, a shell having a slot or orifice, means for moving the shell from position relative to the receptacle to position relative to the chamber, and means for generating a melting temperature in the chamber.

8. In an apparatus for manufacturing glass sheets, the combination of a glass-containing receptacle, a shell having a slot or orifice, means for adjusting the shell relative to the height of glass in the receptacle, and means for drawing the glass away from the slot at a rate equal to the flow of glass therethrough.

9. In an apparatus for the manufacture of glass sheets, the combination of means for feeding glass through a shaping slot or orifice, mechanism for drawing glass away from the slot, and means for adjusting the drawing so as to maintain the mean axis of the sheet in or approximately in the same plane regardless of variations in thickness.

10. In an apparatus for manufacturing glass sheets, the combination of means for feeding glass through a shaping orifice, and one or more pairs of driven rolls constructed to yield in planes at right angles to their axes without distorting their peripheries and without shifting their axes of rotation.

11. In an apparatus for manufacturing glass sheets, the combination of means for feeding glass through a shaping slot or orifice, and one or more pairs of driven rollers consisting of sections movable transverse of the axes of rotation.

12. In an apparatus for manufacturing glass sheets, the combination of means for feeding glass through a shaping slot or orifice, one or more pairs of driven rollers consisting of a series of transversely-movable sections and equalizing levers or members connected to adjacent sections and to the shafts of the rollers.

13. In an apparatus for manufacturing glass sheets, the combination of means for feeding glass through a shaping slot or orifice, one or more pairs of driven rollers consisting of transversely-movable sections, and driving connections between adjacent sections.

14. In an apparatus for manufacturing glass sheets, the combination of means for feeding glass through a shaping slot or orifice, one or more pairs of rollers, means for rotating said rollers, and connections from the driving mechanism to the rollers having a torsional strength less than the frictional bite of the rollers on the sheet.

15. In an apparatus for manufacturing glass sheets, the combination of means for feeding glass through a shaping slot or orifice, one or more pairs of rollers, means for rotating the rollers, and a frictional connection from the driving means to the rollers and having a torsional strength less than the frictional bite of the rollers on the sheet.

16. In an apparatus for manufacturing glass sheets, the combination of means for feeding glass through a shaping slot or orifice, one or more pairs of driven rollers movably mounted and means for imparting a similar and equal movement to one roller on the movement of the other roller.

17. In an apparatus for manufacturing glass sheets, the combination of means for feeding glass through a shaping slot or orifice, means for drawing the glass away from the slot or orifice, and reducing it to the desired thickness, a cutter, and means for moving the cutter transverse of the direction of movement of the sheet and in the direction of movement of the sheet and at the same rate.

18. In an apparatus for manufacturing glass sheets, the combination of means for feeding glass through a shaping slot or orifice, means for drawing the glass vertically from the slot or orifice, means for cutting the glass, a horizontally-arranged runway and a pivotally-mounted frame for receiving the severed sections and having means for delivering them to the runway.

19. In an apparatus for manufacturing glass sheets the combination of a movable shell having a slot or orifice connected to a glass-containing receptacle, means for melting glass adhering to the walls of the slot or orifice, and means for shifting the shell from operative position to position in operative relation to the glass-melting means.

In testimony whereof I have hereunto set my hand.

HALBERT K. HITCHCOCK.

Witnesses:
BAYARD H. CHRISTY,
CHARLES BARNETT.

---

Correction in Letters Patent No. 832,860.

It is hereby certified that Letters Patent No. 832,860, issued October 9, 1906, upon the application of Halbert K. Hitchcock, of Tarentum, Pennsylvania, for an improvement in "Apparatus for the Manufacture of Sheet-Glass," was erroneously granted to "Halbert K. Hitchcock, his heirs or assigns, and Charles W. Brown, as Trustee, his successors or assigns," whereas said Letters Patent should have been granted to said *Halbert K. Hitchcock and Charles W. Brown, as Trustees, their successors or assigns;* and that the said Letters Patent should be read with this correction therein that the same may conform to the record of the case in the Patent Office.

Signed and sealed this 30th day of October, A. D., 1906.

[SEAL.]

F. I. ALLEN,
*Commissioner of Patents.* severed sections and having means for delivering them to the runway.

19. In an apparatus for manufacturing glass sheets the combination of a movable shell having a slot or orifice connected to a glass-containing receptacle, means for melting glass adhering to the walls of the slot or orifice, and means for shifting the shell from operative position to position in operative relation to the glass-melting means.

In testimony whereof I have hereunto set my hand.

HALBERT K. HITCHCOCK.

Witnesses:
BAYARD H. CHRISTY,
CHARLES BARNETT.

---

Correction in Letters Patent No. 832,860.

It is hereby certified that Letters Patent No. 832,860, issued October 9, 1906, upon the application of Halbert K. Hitchcock, of Tarentum, Pennsylvania, for an improvement in "Apparatus for the Manufacture of Sheet-Glass," was erroneously granted to "Halbert K. Hitchcock, his heirs or assigns, and Charles W. Brown, as Trustee, his successors or assigns," whereas said Letters Patent should have been granted to said *Halbert K. Hitchcock and Charles W. Brown, as Trustees, their successors or assigns;* and that the said Letters Patent should be read with this correction therein that the same may conform to the record of the case in the Patent Office.

Signed and sealed this 30th day of October, A. D., 1906.

[SEAL.]

F. I. ALLEN,
*Commissioner of Patents.*

It is hereby certified that Letters Patent No. 832,860, issued October 9, 1906, upon the application of Halbert K. Hitchcock, of Tarentum, Pennsylvania, for an improvement in "Apparatus for the Manufacture of Sheet-Glass," was erroneously granted to "Halbert K. Hitchcock, his heirs or assigns, and Charles W. Brown, as Trustee, his successors or assigns," whereas said Letters Patent should have been granted to said *Halbert K. Hitchcock and Charles W. Brown, as Trustees, their successors or assigns;* and that the said Letters Patent should be read with this correction therein that the same may conform to the record of the case in the Patent Office.

Signed and sealed this 30th day of October, A. D., 1906.

[SEAL.]

F. I. ALLEN,
*Commissioner of Patents.*